United States Patent [19]

McFarland

[11] 4,037,692
[45] July 26, 1977

[54] SPEED RESPONSIVE FLUID COUPLING AND CLUTCH

[76] Inventor: Douglas F. McFarland, Davis City, Iowa 50065

[21] Appl. No.: 657,453

[22] Filed: Feb. 12, 1976

[51] Int. Cl.² .................... F16H 41/18; F16D 43/14
[52] U.S. Cl. .................................. 192/3.31; 60/353; 192/57
[58] Field of Search ............... 192/3.31, 57, 58 A, 192/58 C, 3.28, 3.29, 3.3; 60/353, 355

[56] References Cited

U.S. PATENT DOCUMENTS

| | | | |
|---|---|---|---|
| 1,125,593 | 1/1915 | Pinckney | 192/57 |
| 1,858,514 | 5/1932 | Lell | 192/57 X |
| 2,034,757 | 3/1936 | Herreshoff | 192/3.31 |
| 2,380,734 | 7/1945 | Eastin | 192/3.31 |
| 2,427,432 | 9/1947 | Wilhelmg | 192/58 C |
| 2,543,929 | 3/1951 | Olman | 192/58 X |
| 3,363,731 | 1/1968 | Willems | 192/57 X |

Primary Examiner—Benjamin W. Wyche
Attorney, Agent, or Firm—Zarley, McKee, Thomte, Voorhees & Sease

[57] ABSTRACT

A fluid coupling comprising a cylindrical housing having first and second vane supports secured to the opposite ends thereof. An input shaft is secured to the first vane support so that rotation of the input shaft causes rotation of the first and second vane supports and the housing. An output shaft rotatably extends through the second vane support into the interior of the housing and has a clutch support mounted thereon within said housing for rotation therewith. The housing has a first fluid compartment between the inner end of the first vane support and one end of the clutch support. The housing also has a second fluid compartment between the inner end of the second vane support and the clutch support. A plurality of movable vanes are provided on the inner ends of the first and second vane supports and are normally maintained in a retracted position but are movable into the fluid compartments upon the first and second vane supports being rotated at a pre-determined rotation so that the clutch support will also be rotated. A plurality of circumferentially spaced clutches are mounted on the clutch support and are normally maintained out of engagement with the housing but are movable into frictional engagement therewith upon the clutch support being rotated at a predetermined rate of rotation so that the clutch support and housing will be rotated at the same speed without any slippage therebetween. The movable vanes and the clutches may be moved mechanically, hydraulically or by centrifugal force.

7 Claims, 5 Drawing Figures

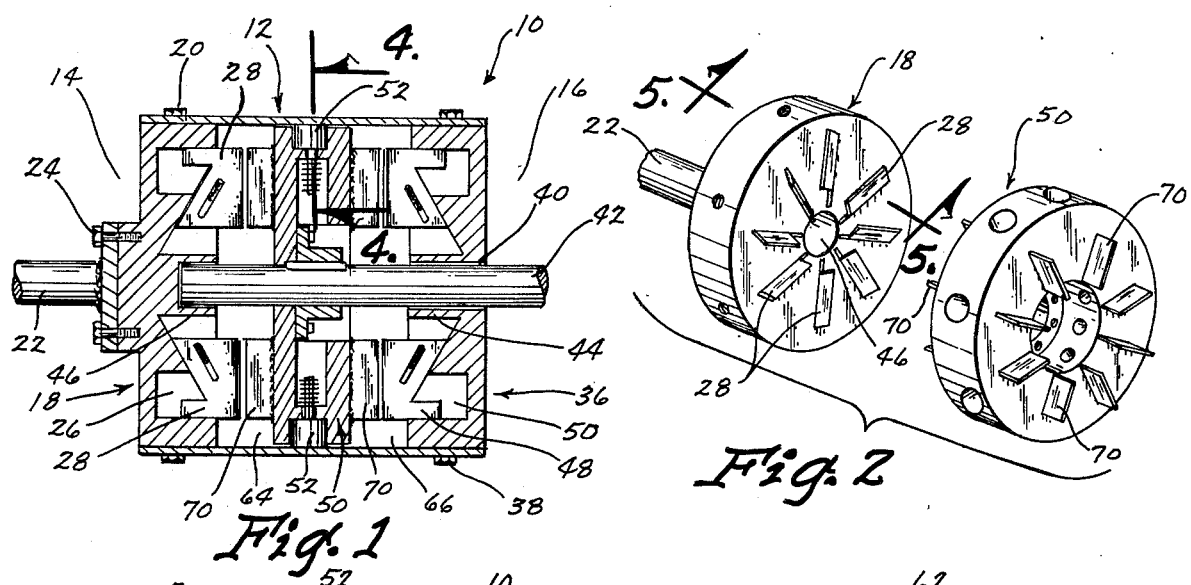
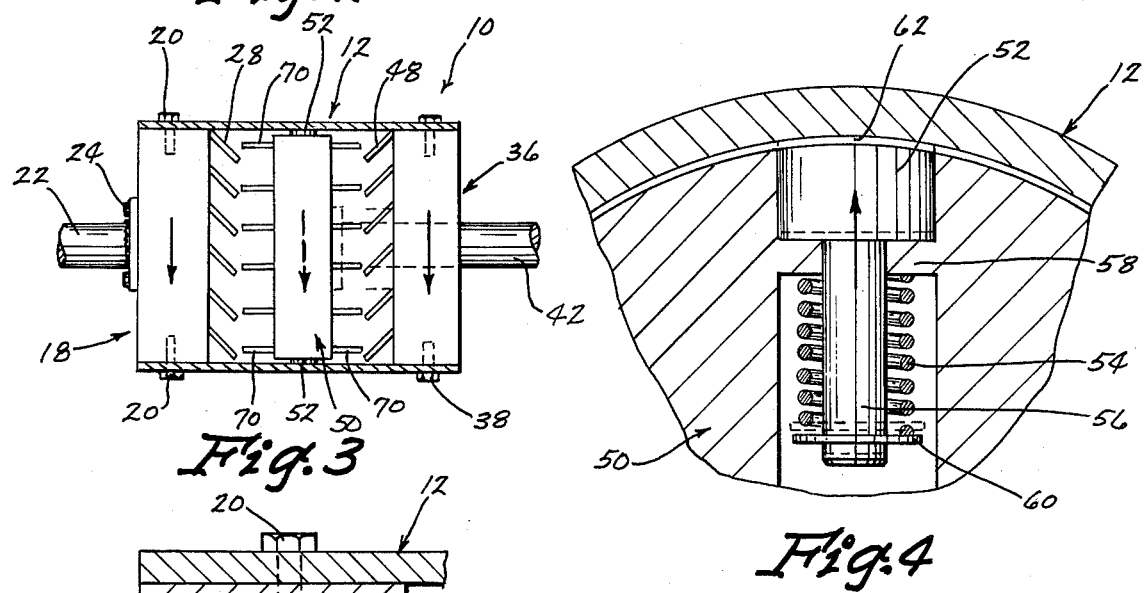
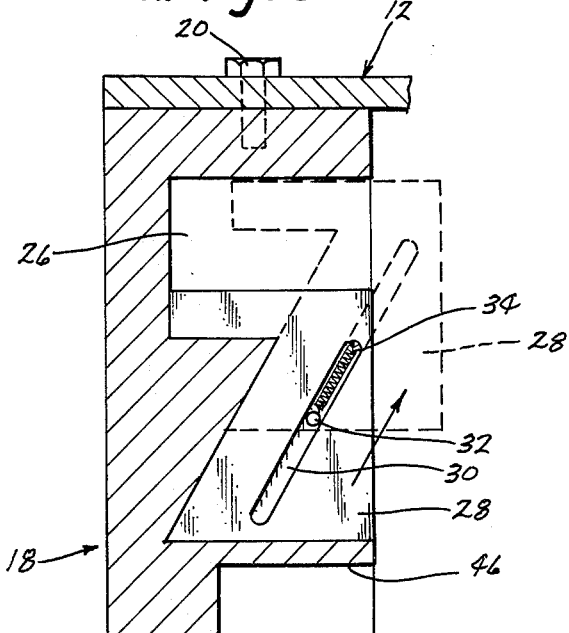

1

SPEED RESPONSIVE FLUID COUPLING AND CLUTCH

BACKGROUND OF THE INVENTION

This invention relates to a fluid coupling and more particularly to a fluid coupling exhibiting improved efficiency.

Conventional fluid coupling experience heat problems as well as loss of motion and energy problems due to the construction thereof inasmuch as a certain amount of slippage occurs between the driving and driven elements.

Therefore, it is a principle object of the invention to provide an improved fluid coupling.

A still further object of the invention is to provide a fluid coupling having means to lock the driven element into engagement with the driving element so that the driven element is rotating at the same rate of rotation as the driving element without any slippage therebetween.

A further object of the invention is to provide a fluid coupling including vane supports having movable vanes mounted thereon which are normally in a retracted position but which are movable into fluid compartments at a predetermined time.

A still further object of the invention is to provide a fluid coupling which eliminates power drain at the initial acceleration.

A still further object of the invention is to provide a fluid coupling which is economical to manufacture and durable in use.

BRIEF DESCRIPTION OF THE DRAWINGS

FIG. 1 is a longitudinal sectional view of the fluid coupling of this invention:

FIG. 2 is a partial exploded perspective view of the fluid coupling:

FIG. 3 is a schematic sectional view of the fluid coupling:

FIG. 4 is an enlarged partial sectional view as seen on lines 4—4 of FIG. 1; and FIG. 5 is an enlarged partial sectional view seen on lines 5—5 of FIG. 2.

DESCRIPTION OF THE PREFERRED EMBODIMENT

The fluid coupling of this invention is referred to generally by the reference numeral 10 and generally comprises a cylindrical housing 12 having an input end 14 and an output end 16. Vane support 18 is secured to the input end 14 of housing 12 by bolts 20. Input shaft 22 is connected to vane support 18 by bolts 24. The inner end of vane support 18 is provided with a plurality of radially spaced slots 26 formed therein each of which have a vane 28 mounted therein.

The vanes 28 are normally in a retracted or inoperative position within the slots 26 as illustrated by solid lines in FIG. 5 but are movable at a predetermined time to the extended or operative position illustrated by broken lines in FIG. 5. One means of normally maintaining the vanes 28 in a retracted position is illustrated in the drawings. As seen in FIG. 5, vane 28 is provided with an elongated slot 30 which receives a pin 3 extending from vane support 18. Spring 34 is mounted in slot 30 between pin 32 and the inner end of the slot 30 to yieldably maintain the vane 28 in a retracted position. The vanes 28 will emerge from the slots 26 upon vane support 18 being rotated at a predetermined rate of rotation due to centrifugal force. Thus, the strength of the springs 34 determines when the vanes 28 will begin to emerge from their respective slots 26.

Vane support 36 is secured to the output end 16 of housing 10 by bolts 38 for rotation therewith. Vane support 36 has a central opening 40 formed therein which rotatably receives the driven or output shaft 42 extending therethrough. A suitable bearing 44 is positioned in the central opening 40 and rotatably embraces the shaft 42. The inner end of shaft 42 is rotatably mounted in a bearing 46 provided in the inner end of vane support 18 as illustrated in FIG. 1.

The inner end of vane support 36 is provided with a plurality of movable vanes 48 mounted in slots 50 formed in the inner end of vane support 36. The vanes 48 are identical in construction to the vanes 28 and will not be described in detail.

The numeral 50 refers to a clutch support mounted on the shaft 42 for rotation therewith. A plurality of radially spaced clutch elements 52 are movably mounted on the clutch support 50 and are normally maintained in the retracted or disengaged position by the springs 54 as best illustrated in FIG. 4. As seen in FIG. 4, clutch element 52 includes a spindle portion 56 having the spring 54 mounted thereon. Spring 54 is positioned between the shoulder 58 and the washer 60 so as to yieldably maintain the clutch element 52 in the position illustrated in FIG. 4. The clutch elements 52 move into frictional engagement with the inside surface 62, due to centrifugal force, of housing 12 upon clutch support 50 being rotated at a predetermined rate of rotation. Thus, the strength of the springs 54 determines when the clutch elements 52 will move into frictional engagement with the housing 12.

The numeral 64 refers to a fluid compartment positioned between the inner end of the vane support 18 and one end of the clutch support 50. The numeral 66 refers to a fluid compartment positioned between the inner end of vane support 36 and clutch support 50. Compartments 64 and 66 are filled with a conventional fluid coupling or automatic transmission fluid. Clutch support 50 is provided with a plurality of spaced-apart fixed vanes 68 positioned in compartments 64 and a plurality of fixed vanes 70 positioned in compartments 66.

Assuming that the fluid coupling 10 is connected to an engine crankshaft or that the shaft 22 is in fact a crankshaft, the normal method of operation is as follows. With shaft 22 being rotated at an idle speed, shaft 22, vane support 18, housing 12 and vane support 36 will be rotating with clutch support 50 and shaft 42 being stationary. In such an idle condition, the vanes 28 and 48 will be in their retracted positions as will the clutch elements 52. Upon acceleration of shaft 22, the rotation of the vane supports 18 and 36 will cause the vanes 28 and 48 to move into the fluid compartments 64 and 66 respectively to cause the oil or fluid therein to be revolved. The revolving of the fluid in the compartments 64 and 66 will cause the clutch support 50 to begin to rotate. At a predetermined rate of rotation of clutch support 50, the clutch elements 52 move outwardly due to centrifugal force and engage the housing 12 to "lock-up" the unit to achieve a 1:1 ration with the crankshaft. In other words, the clutch support 50 will be rotating at the same rate of rotation as shaft 22 since there is no slippage therebetween. This eliminates heat problems, loss of motion and energy losses normally experienced in conventional fluid coupling.

The springs 34 and 54 are easily changed to control the state of both the emergence of the vanes and the speed of lock-up. While it has been described that springs are used to control the emergence of the vanes and the clutch elements, it should be noted that the movement thereof may be mechanically or hydraulically actuated.

Thus it can be seen that a novel fluid coupling has been provided which has the ability to lock-up at a predetermined speed. The construction of the vane supports and the clutch support results in an elimination of a power drain at initial acceleration.

Thus it can be seen that a fluid coupling of this invention accomplishes at least all of the stated objectives.

I claim:

1. In a fluid coupling comprising,
   a cylindrical housing means having first and second ends,
   a first vane support means secured to said first end of said housing means for rotating said housing and having inner and outer ends,
   a power input shaft secured to said first vane support means,
   a second vane support means secured to said second end of said housing means for rotation therewith and having inner and outer ends, said second vane support means having a central opening formed therein,
   an output shaft rotatably extending into said housing means through said central opening in said second vane support means,
   a clutch support means rotatably mounted on said output shaft in said housing means for rotation with said output shaft, said clutch support means having first and second ends,
   said housing means having a first fluid compartment between the inner end of said first vane support means and said first end of said clutch support means,
   said housing means having a second fluid compartment between the inner end of said second vane support means and said second end of said clutch support means,
   movable vanes mounted on said inner end of said first vane support means, said movable vanes normally being in an inoperative position but being movable into said first fluid compartment at a predetermined time to cause the fluid therein to be revolved whereupon said clutch support means will be rotated,
   movable vanes mounted on said inner end of said second vane support means, said movable vanes normally being in an inoperative position but being movable into said second fluid compartment at a predetermined time to cause the fluid therein to be revolved whereupon said clutch support means will be rotated,
   and a movable clutch means on said clutch support means, said clutch means normally being in a disengaged position but being movable into engagement with said housing means at a predetermined time whereby said housing means and said clutch support means will be rotated at the same speed.

2. The fluid coupling of claim 1 wherein fixed vanes are mounted on said first and second ends of said clutch support means.

3. The fluid coupling of claim 1 wherein said vanes on said first and second vane support means are movably mounted in slots formed in said first and second vane support means, and means normally maintaining said vanes within said slots.

4. The fluid coupling of claim 3 wherein said means normally maintaining said vanes within said slots comprises a spring means.

5. The fluid coupling of claim 1 wherein said clutch means comprises a plurality of circumferentially spaced and movably mounted clutches.

6. The fluid coupling of claim 5 wherein said clutches are spring loaded to yieldably resist the movement of said clutches towards engagement with said housing means, said clutch springs being overcome by centrifugal forces upon a predetermined rate of rotation of said clutch support means.

7. In a fluid coupling comprising,
   a housing means having first and second ends,
   a vane support means secured to said first end of said housing means for rotating said housing means and having inner and outer ends,
   a power input shaft secured to said vane support means,
   an output shaft rotatably extending into said housing means through one end thereof,
   a clutch support means rotatably mounted on said output shaft in said housing means for rotation with said output shaft,
   said housing having a fluid compartment between the inner end of said vane support means and said clutch support means,
   movable vanes mounted on said inner end of said vane support means,
   said movable vanes normally in an inoperative position but being movable into said fluid compartment at a predetermined time to cause the fluid therein to be revolved whereupon said clutch support means will be rotated,
   and a movable clutch means on said clutch support means, said clutch means normally being in a disengaged position but being movable into engagement with said housing means at a predetermined time whereby said housing means and said clutch support means will be rotated at the same speed.

* * * * *